US010708388B2

(12) United States Patent
Hsu et al.

(10) Patent No.: US 10,708,388 B2
(45) Date of Patent: Jul. 7, 2020

(54) BRANCHED NODES IN A WORKFLOW

(71) Applicant: salesforce.com, inc., San Francisco, CA (US)

(72) Inventors: Stephen Hsu, San Francisco, CA (US);
Ashwin Kashyap, San Jose, CA (US);
Cassandra Funk, Mount Prospect, IL (US); Laurel Knell, Atlanta, GA (US);
Eric Berg, Atlanta, GA (US); Martin Edward Long, Alameda, CA (US);
Avital Arora, San Mateo, CA (US);
Stanley Lemon, Indianapolis, IN (US);
William Victor Gray, Kitchener (CA);
Philip Alexander Waligora, Mill Creek, WA (US); Reena Parekh, Brookhaven, GA (US); Kyle Coleman Skibble, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 7 days.

(21) Appl. No.: 16/229,920

(22) Filed: Dec. 21, 2018

(65) Prior Publication Data
US 2020/0099771 A1    Mar. 26, 2020

Related U.S. Application Data

(60) Provisional application No. 62/734,879, filed on Sep. 21, 2018.

(51) Int. Cl.
*G06F 15/16*  (2006.01)
*H04L 29/08*  (2006.01)

(52) U.S. Cl.
CPC ........ *H04L 67/327* (2013.01); *H04L 67/1097* (2013.01); *H04L 67/2804* (2013.01); *H04L 67/288* (2013.01)

(58) Field of Classification Search
USPC ....... 709/203, 205, 206, 217, 219, 223, 224, 709/226, 228, 230, 232, 238; 703/7;
(Continued)

(56) References Cited

U.S. PATENT DOCUMENTS 9,549,521 B1 * 1/2017 Monk ................... A01H 5/10
2004/0117749 A1 * 6/2004 Lalonde ................. G06F 8/38
703/7
(Continued)

*Primary Examiner* — Quang N Nguyen
(74) *Attorney, Agent, or Firm* — Holland & Hart LLP

(57) ABSTRACT

Methods, systems, and devices for defining an action node series at a database system are described. In some examples, the workflow may include one or more nodes are associated with an action. When executed, the workflow may produce an outcome based on the occurrence of an event or parameter associated with the one or more nodes. In some examples, the workflow may include one or more branch nodes. A branch node may include logic such that, when the workflow is executed, the logic selects a particular workflow path that includes its own specific nodes. The path may be selected based on the occurrence of an event or a value of one or more parameters. Thus, when a workflow including one or more branch nodes is executed, the outcome of the workflow may be based on the occurrence of the event or the value of the parameter.

16 Claims, 12 Drawing Sheets

(58) Field of Classification Search
USPC .......................................... 717/174; 719/313
See application file for complete search history.

(56) References Cited

U.S. PATENT DOCUMENTS

| | | | |
|---|---|---|---|
| 2008/0016505 A1* | 1/2008 | Bucklew | G06F 8/34 |
| | | | 717/174 |
| 2012/0124593 A1* | 5/2012 | Walsh | G06Q 10/00 |
| | | | 719/313 |
| 2019/0073599 A1* | 3/2019 | Crable | G06F 16/9027 |
| 2019/0079738 A1* | 3/2019 | Samuel | G06F 8/10 |
| 2019/0102574 A1* | 4/2019 | Roberts | G06F 21/606 |
| 2019/0313214 A1* | 10/2019 | Colonna | H04W 64/006 |

* cited by examiner

BRANCHED NODES IN A WORKFLOW

CROSS REFERENCE

The present Application for Patent claims priority to U.S. Provisional Patent Application No. 62/734,879 by Hsu et al., entitled "Branched Nodes in A Workflow," filed Sep. 21, 2018, which is assigned to the assignee hereof and expressly incorporated by reference herein.

FIELD OF TECHNOLOGY

The present disclosure relates generally to database systems and data processing, and more specifically to branched nodes in an action node series.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may support an application for defining a workflow and may include a database server configured to execute the workflow. In some cases, the workflow may involve multiple processes that, when completed, advance the workflow to a subsequent process. A workflow may be limited to linear progressions between steps of the workflow, which may limit the utility of the workflow for certain use cases. Customizing a linear workflow may involve connecting several separate workflows together, which may increase the complexity and reduce the efficiency (e.g., computation time, data storage retrieval time etc.) associated with executing such workflows.

DETAILED DESCRIPTION

Figure 1:
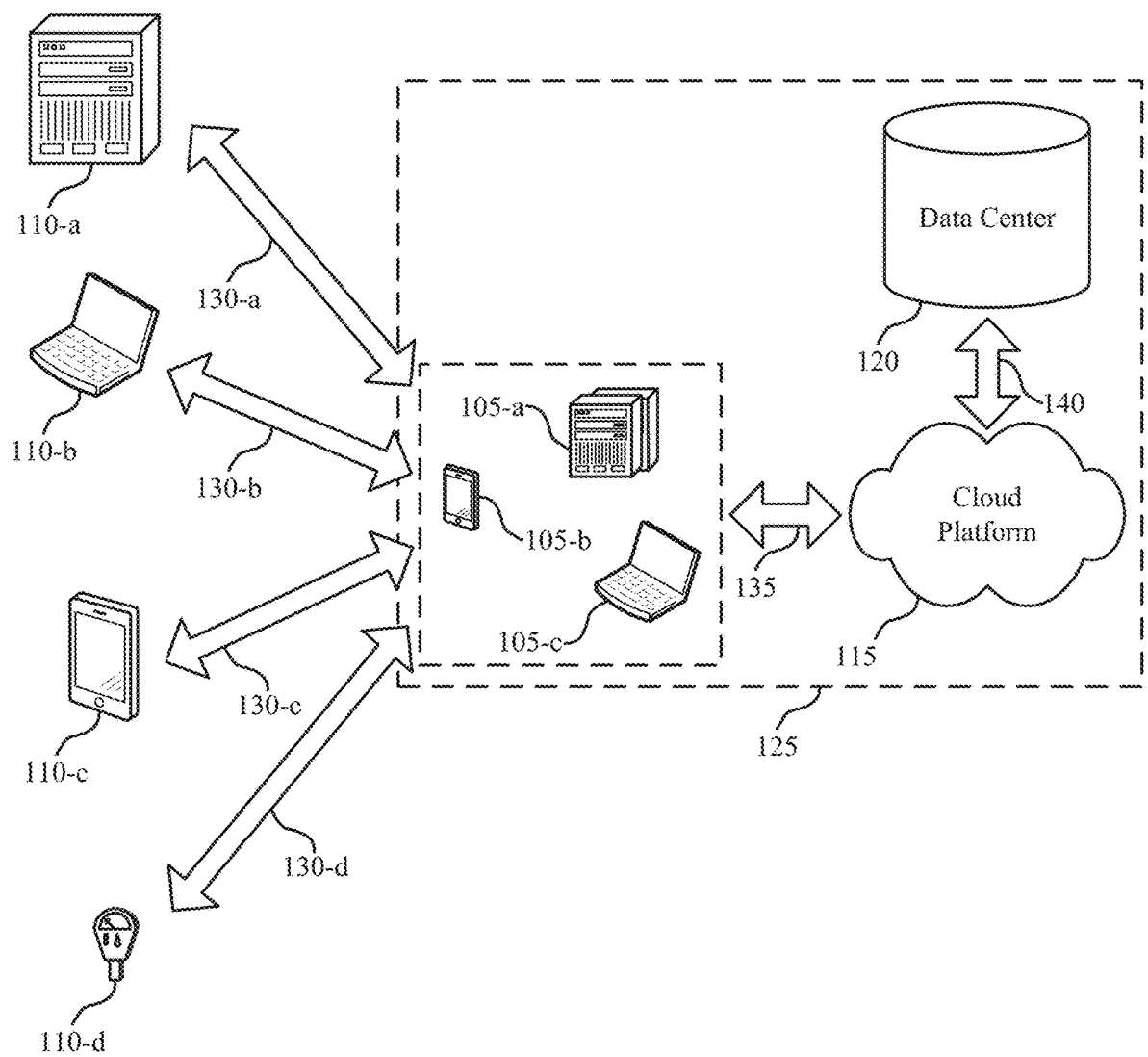
FIG. 1 illustrates an example of a system for defining an action node series at a database system that supports branched nodes in an action node series in accordance with aspects of the present disclosure.

An application may support defining an action node series, which includes several events arranged in a particular order. For example, an action node series (e.g., a workflow) may be defined for a sales team engaging with a potential list of customers, and the steps of the action node series may include calling the customer, waiting a predetermined time, and then following up with an email. In some cases, an application for defining such action node series is limited to defining and executing linear workflows. For example, a linear workflow may be limited to progressing from one step to another without the capability of diverging at a step based on an occurrence associated with that step. Due to this linear progression, a typical workflow application may not account for any particular characteristics of a user, nor does it adapt based on learned outcomes. Rather, a typical workflow operates in a purely static manner.

However, in accordance with aspects of the present disclosure, an action node series may incorporate one or more nodes (e.g., one or more branch nodes) that may allow for the action node series to operate in a branched and dynamic fashion (e.g., using conditional logic). When operating in a dynamic manner, a workflow may account for various characteristics associated with any one individual or event, may adapt based on learned outcomes, and may recommend to an operator one or more desirable outcomes based on historical results. Accordingly, the systems and methods described herein may provide for an action node series having optimized outcomes for both operators of the workflow and for end-users.

A database system that supports an action node series may include one or more nodes that are each configured to perform an action. As described herein, an action may be associated with an occurrence of a particular event (e.g., placing a phone call, sending an email, etc.). Thus a system having only "traditional" nodes may progress linearly (e.g., performing one action after another). In some examples, the database system may define one or more "traditional" nodes as a branch node. A branch node may incorporate logic (e.g., conditional logic) that allows for the workflow to progress in a non-linear manner.

For example, a "traditional" set of nodes may provide for an email to be sent to an end-user, followed by a waiting period (e.g., one day) and a follow-up phone call. In this example, each of the actions occurs subsequently in a defined order without allowing for variation. However, by incorporating conditional logic (e.g., one or more branch nodes), additional actions and/or events may occur based on a result of each action. For example, the node associated with a waiting period may be designated as a branch node. Thus if a response is received within the waiting period (e.g., one day) a particular action or set of actions may occur (e.g., the workflow may progress down a first branch). Conversely, if no response is received, a different action or set of actions may occur (e.g., the workflow may progress down a second branch). Accordingly, introducing branch nodes into an action node series may provide for a tailored (e.g., an optimized) outcome for operators of the workflow and for end-users.

In some examples, the introduction of branch nodes into the action node series may allow for machine learning techniques to occur. For example, every time that a particular action node series is executed, an outcome of the workflow may be stored. The outcome may be, for example, that an end user purchases a particular product or that a lead is converted to a customer. The database system described herein may be configured to monitor, over time, the outcomes of each executed action node series and the actions conducted to arrive at the outcome. In some examples, the database system may analyze this data to determine certain actions that provide more value than others. This may be based in part on comparing various completed actions with user characteristics (e.g., contact information of an individual), particular information provided to one or more users (e.g., whether the user was contacted via phone or email), and the like. In other words, because of the ability to conditionally define different branches in a workflow (which may each contain different sets of actions or variations on the same actions), the system may analyze the relationship between the outcome of a workflow and which branches were taken during the workflow. This may ultimately allow for the database system to recommend (e.g., to a user) and implement actions that are expected to best-optimize outcomes for both operators of the action node series and for end-users.

Aspects of the disclosure are initially described in the context of a system for defining an action node series at a database system that supports branched nodes. Aspects of the disclosure are further described with respect to an action node series and a data flow diagram. Aspects of the disclosure are further illustrated by and described with reference to apparatus diagrams, system diagrams, and flowcharts that relate to action node series' that support branched nodes.

FIG. 1 illustrates an example of a system 100 for cloud computing that supports branched nodes in an action node series in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Subsystem 125 may support a system (e.g., an application) that supports branched nodes in an action node series. For example, the server 105-a may be or may be referred to as a database system, and may execute an action node series as described herein. In some examples, the server 105-a may assign a plurality of nodes to the action node series (e.g., in response to input from a user via an application). Each node of the plurality of nodes may correspond to an action and a set of metadata associated with the action. In some examples, the metadata associated with the action may be stored at data center 120. Accordingly the server 105-a may access the metadata via cloud platform 115. In some examples, the nodes assigned to the action node series at the server 105-a may be assigned by a user (e.g., via a user device 105-*b*). Thus, in some examples, the user device 105-*b* may communicate a user's selection (e.g., input) of one or more nodes to be included in an action node series to the server 105-*a*. In some examples, the communication may occur via cloud platform 115.

In some examples, the server 105-*a* may define at least one node of the plurality of nodes as a branch node. As described herein, a branch node may define a plurality of branches (e.g., workflow branches) that each includes a set of nodes. In some examples, each node may include at least one different action, at least one different set of metadata associated with a same action, or both. Additionally or alternatively, the branch node may include programmed logic for selecting a branch of the plurality of branches based at least in part on an occurrence of an event, a value of a parameter, or both.

In some examples, the defined branch node or nodes may be indicated by a user (e.g., via a user device 105-*b*). Thus, in some examples, the user device 105-*b* may communicate a user's selection (e.g., input) of one or more branch nodes to be included in an action node series to the server 105-*a*. In some examples, the communication may occur via cloud platform 115. After defining at least one node as a branch node, the action node series may be executed on the server 105-*a*. The outcome of the action node series may be based on the occurrence of an event or a value of the parameter (e.g., based on the action associated with a branch node of an action node series). The outcome, or an indication (e.g., a summary) of the outcome may be transmitted to a user (e.g., to a user device 105-*b*). In some examples, the transmission may occur via cloud platform 115.

In some database systems described herein, workflows may operate in a dynamic manner (e.g., by incorporating conditional logic). By operating dynamically, an action node series may adapt based on learned outcomes, and may recommend to an operator one or more desirable outcomes based on historical results. For example, a "traditional" set of nodes may provide for an email to be sent to an end-user, followed by a waiting period (e.g., one day) and a follow-up phone call. In this example, each of the actions necessarily occurs in a linear fashion. However, by incorporating conditional logic (e.g., one or more branch nodes), additional actions and/or events may occur based on a result of each action. For example, the node associated with a waiting period may be designated as a branch node. Thus if a response is received within the waiting period (e.g., one day) a particular action or set of actions may occur. Conversely, if no response is received, a different action or set of actions may occur. Accordingly, introducing branch nodes into an action node series may provide for a tailored (e.g., an optimized) outcome for operators of the workflow and for end-users.

The ability to incorporate conditional logic into branched nodes enables the functionality of building in multiple branches into a single action node series. In contrast, conventional workflow builder applications may only support linear workflows, and to customize such workflows, multiple separate linear workflows may have to be daisy-chained together using custom logic created by the end user of the application. Such techniques may increase the technical complexity and reduce the efficiency associated with executing such workflows. For example, if multiple linear workflows are daisy-chained together, the system may incur additional processing load to execute them and retrieve the data necessary to support the different and separate workflows. Therefore, enabling branching nodes within a single action node series may provide a technical advantage that address this issue, and may increase the computational stability and efficiency associated with operating branched, complex workflows within a single workflow.

In some examples, the database systems described herein may support machine learning techniques to optimize an action node series. For example, when an action node series is executed, an outcome exists. Thus when a plurality of action node series' are generated, a plurality of outcomes exist. Because a workflow that incorporates branch nodes may receive at a same outcome in a variety of ways (e.g., based on a particular workflow branch selected), it may be desirable to monitor, over time, the outcomes of each executed action node series and the actions conducted to arrive at the outcome. By monitoring the outcomes and the corresponding actions undertaken, the database system may be configured to recommend (e.g., to a user) and implement actions that are expected to best-optimize outcomes for both operators of the action node series and for end-users.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
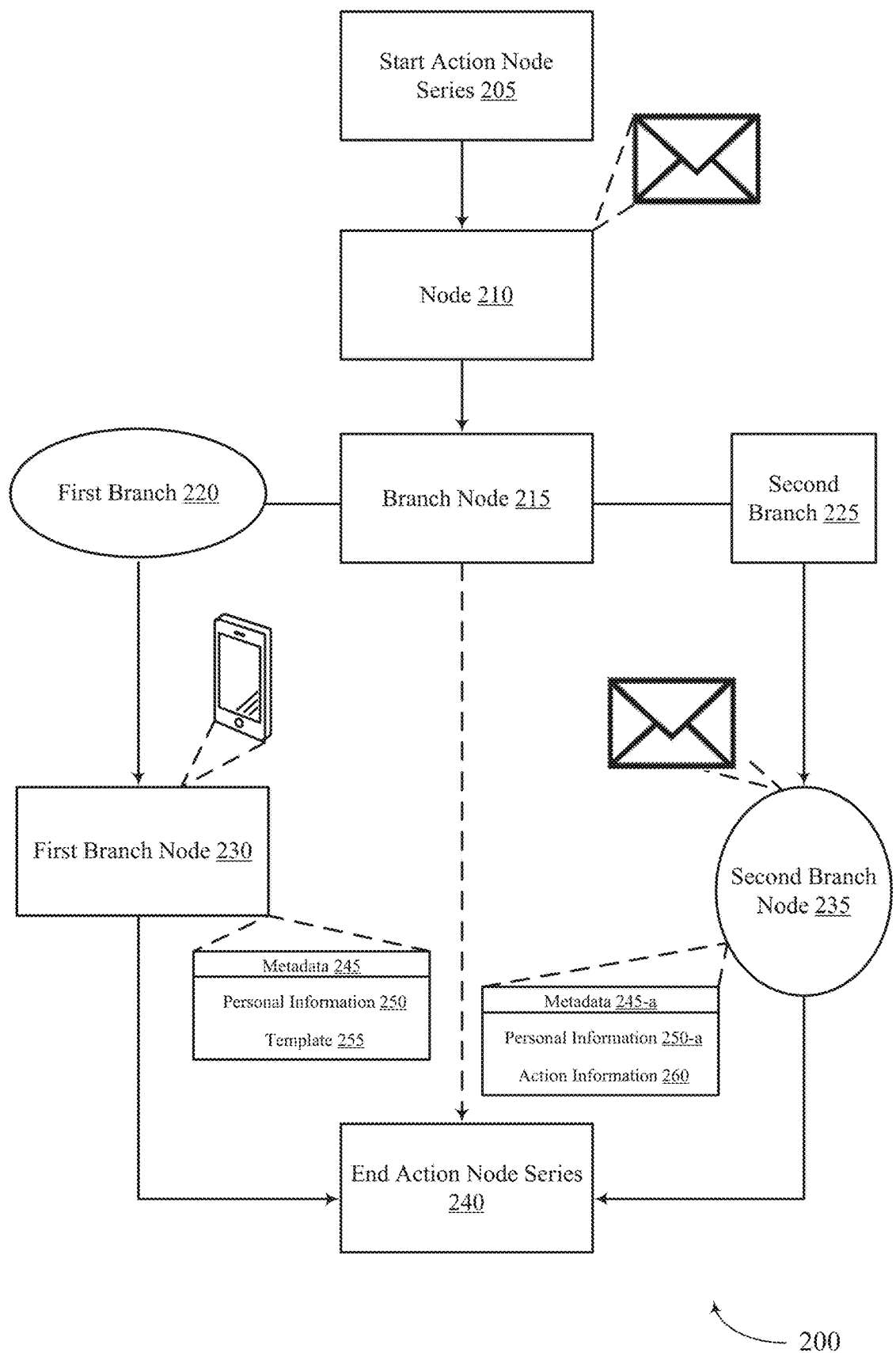
FIG. 2 illustrates an example of an action node series that includes one or more branched nodes in accordance with aspects of the present disclosure.

FIG. 2 illustrates an example of an action node series 200 that includes one or more branched nodes in accordance with aspects of the present disclosure. In some examples, the action node series 200 may include a start node (e.g., a start action node series 205 node), a node 210, and a branch node 215. In some examples, the branch node 215 may include multiple workflow branches, such as first branch 220 and second branch 225. In some examples, first branch 220 may include or may be associated with first branch node 230 and second branch 225 may include or may be associated with second branch node 235. In some examples, the action node series 200 may include an end node (e.g., end action node series 240 node), which may signify the completion or an end result (e.g., an outcome) of the action node series 200.

In some examples, a user may assign a plurality of nodes to the action node series 200. Each node may correspond to an action and a set of metadata associated with the action. For example, the action associated with a node may be or may include sending an email to an individual (e.g., a customer). The underlying metadata of the action may, for example, include the content to be included in the email. In some examples, the action may be automated (e.g., performed by a database system). Thus metadata associated with the action may include one or more instructions regarding drafting the email. Stated another way, the metadata may instruct the database server to write an email, and may inform the database server of what content to include.

The set of metadata associated with the action may include or may be associated with a variety of characteristics. For example, the metadata may be associated with an identity of a person associated with the action, contact information associated with the person associated with the action, a template of text associated with the action, a duration associated with the action, or a combination thereof. Stated another way, the metadata may inform the action node series 200 who the action pertains to, how to best contact that individual, what the individual's contact information is, what content is to be included or associated with the action, and the like. In some examples, the metadata may facilitate the action being automated (e.g., being performed automatically by the database server).

The action to be performed (e.g., at a node) by the action node series 200 may include one or more of making a phone call, sending an electronic message, waiting a predetermined amount of time, or exiting the workflow. The quantity and types of actions to be performed by the action node series 200 is not limited by these examples and, as described herein, may be associated with one or more external systems and actions associated with the external systems.

In some examples, the action of the node may be predefined by a user. For example a user may, when assigning a node, indicate what action the node is intended to perform. In some examples, the user may indicate particular features or content to be associated with the action. For example, if the action is associated with sending an email, the user may indicate (e.g., to the database system) when the email is to be sent, who the email should be sent to, and/or the content of the email.

Node 210 may be an example of one of a plurality of nodes assigned to a workflow (e.g., to action node series 200). In some examples, the node 210 may be associated with sending an email to a customer requesting to connect (e.g., regarding a sales opportunity). In some examples, the user may indicate to the database system who the customer (or customers) is, when the email should be sent, and what the content of the email should include. In some examples, the identifying information (e.g., who the customer is), when the email should be sent, and what the content of the email should include may be based on metadata associated with the action. For example, the information may be obtained from an external source (e.g., a prepopulated table) and the email may be generated and sent automatically.

In some examples, a user may wish to follow-up with the recipients of the email sent (e.g., at node 210) based on the occurrence (or non-occurrence) of one or more events. Thus, in some examples, at least one node of the plurality of nodes (e.g., of action node series 200) may be defined as a branch node (e.g., branch node 215). In some examples (not shown), the action node series 200 may include a plurality of branch nodes, and each branch node may include two or more workflow branches. In some examples, the branch node may define a plurality of workflow branches (e.g., first branch 220, second branch 225) that each include a set of nodes (e.g., first branch node 230, second branch node 235) that each correspond to a different action, at least one different set of metadata associated with the action, or both. In some examples, each of the workflow branch nodes may be customizable by a user. For example, the user may customize a script associated with a phone call or edit an email template. In some examples, the user may customize a respective workflow branch node before execution of the action node series 200 or after a portion of the action node series 200 has been executed (e.g., after executing the action node series 200 for a portion of a plurality of workflow occurrences). In some examples, the branch node 215 may include programmed logic for selecting a workflow branch of the plurality of workflow branches based at least in part on an occurrence of an event, a value of a parameter, or both.

As described herein, a user may define branch node 215. In some examples, a user may wish to take a certain action based on the results of the action of node 210. For example, if a user receives a response to the email sent at node 210, he or she may wish to place a phone call to the customer who sent the response email. In some examples, if a user does not receive a response to the email, he or she may wish to send a follow-up email. Thus, branch node 215 may be associated with logic (e.g., programmable logic) that indicates the user's preferences to the action node series 200. If a response is received to the email sent at node 210, branch node 215 may indicate that the workflow is to proceed along the first branch 220. If no response is received to the email sent at node 210, branch node may indicate that the workflow is to proceed along the second branch 225.

In some examples, the first branch 220 may proceed to a first branch node 230, which may be associated with or may include placing a follow-up call to the customer based on his or her response email. In some examples, the first branch node 230 may be associated with metadata 245. The metadata may, for example, include or be associated with personal information 250 or one or more templates 255. The metadata 245 thus may facilitate one or more actions conducted at the first branch node 230. For example, the first branch node 230 may schedule the call (e.g., place an event on the user's calendar, remind him or her to place the follow-up call), may provide a call script to the user, or may place the call directly from the user's device based on the metadata 245. The personal information 250 may, for example, include contact information of a user; the first branch node 230 may call the user based on the contact information (e.g., based on the personal information 250). For example, the first branch node 230 may schedule the call (e.g., by placing an event on the user's calendar) at a time when the customer is most likely to answer the phone. In some examples, the first branch node 230 may interface directly with an application configured to place the call directly. Additionally or alternatively, the one or more templates 255 may be or may be associated with a script that is tailored to a customer based on one or more characteristics of the customer.

In some examples, the second branch 225 may proceed to a second branch node 235, which may be associated with or may include sending a follow-up email to the customer based on not receiving a response to the email sent at node 210. In some examples, the second branch node 235 may be associated with metadata 245-a. The metadata may, for example, include or be associated with personal information 250-a or particular information pertaining to the action. The metadata 245-a thus may facilitate one or more actions conducted at the second branch node 235. In some examples, the second branch node 235 may conduct one or more actions associated with sending the follow-up email. For example, the second branch node 235 may schedule a time for the user to write and/or send the email (e.g., place an event on the user's calendar, remind him or her to send the follow-up email), may compose the email automatically and inform the user that the email is ready to send, or may compose and send the email automatically from an email account associated with the user based on the metadata 245-a. The second branch node 235 may compose and send the email at a time when the customer is most likely to be checking his or her email (e.g., based on action information 260). In some examples, the second branch node 235 may interface directly with an application configured to send the email directly (e.g., a mail application).

In some examples, the first branch 220 and/or the second branch 225 may include nodes associated with performing an action based on an occurrence of an event, a value of a parameter or both. For example, when an action has occurred (e.g., when a phone call has been placed), the system may communicate the occurrence of the call (e.g., to the database) such that the call will not be inadvertently placed again. Stated another way, the action node series may be conducted a second (e.g., a subsequent) time and may proceed down a different branch based on the occurrence of the action. The occurrence of an event may include whether a phone call was returned, whether an electronic message was returned, whether a user engaged with electronic marketing material, or a combination thereof. As described herein, the quantity and types of occurrences are not limited by these examples and, as described herein, may be associated with one or more external systems and events associated with the external systems.

A parameter may be or may include for example, a predefined score or a threshold value. For example, the action node series 200 may be integrated with an external system (e.g., a Salesforce® platform such as Einstein). Based on lead score associated with a potential customer, the branch node 215 may direct the workflow to the first branch 220 or the second branch 225. Stated another way, if the lead score associated with the potential customer exceeds a predefined value (e.g., a threshold), then the logic associated with the branch node 215 will select an appropriate workflow branch. In some examples, based on the lead score (e.g., and the workflow branch selected by the branch node 215) the action node series 200 may prioritize calling the individual (e.g., at the first branch node 230) as opposed to sending the individual an email (e.g., at the second branch node 235).

In some examples, the action node series 200 may be integrated with an external system, such as a marketing system. Based on the occurrence of an event (e.g., a customer viewing a webinar, a customer viewing a whitepaper, etc.), the logic associated with the branch node 215 may select an appropriate workflow branch. For example, if an individual has viewed a particular webinar, the branch node 215 may direct the action node series 200 to the first branch 220. The branch node 215 may direct the action node series to the first branch 220 based on the operation of the action node manager 305 or the cadence engine 315 described below with reference to FIG. 3. The first branch node 230 may send the individual marketing emails based on content and/or information associated with the webinar. In some examples, if an individual has not viewed a particular webinar, the branch node 215 may direct the action node series 200 to the second branch 225. The second branch node 235 may send the individual marketing emails based on content and/or information not associated with the webinar (e.g., different materials than if the user had viewed the webinar).

In some examples, action node series 200 may include a plurality of workflow occurrences. In each occurrence, the action node series 200 may proceed along a first branch 220, a second branch 225, or an additional branch or branches (not shown). For example, action node series 200 may be executed for a plurality of potential customers. As described herein, an email may be sent at node 210 (e.g., sent to a first potential customer) and, based on his or her response, the logic associated with branch node 215 may direct the workflow to one of the first branch 220 or the second branch 225. The workflow may proceed along the respective workflow branch and, at end action node series 240 node, may end. This process (e.g., action node series 200) may be executed for a plurality of potential customers such that, for each customer, an email is sent at node 210 and the logic associated with branch node 215 may direct the workflow to one of the first branch 220 or the second branch 225. In some examples, after the workflow has ended (e.g., at end action node series 240 node), a summary of the respective action node series 200 may be transmitted to a user. The summary may include, for example, that an email was sent at node 210, whether the customer responded (e.g., which workflow branch was selected), and what action was taken at a respective workflow branch node.

In some examples, the action node series 200 may be associated with additional logic that trains the database system for subsequent use. For example, a relationship may be determined between an outcome set of the first and second subsets of the plurality of workflow occurrences and the first and second workflow branches of the plurality of workflow branches. Stated another way, the database system may monitor the outcomes of the first branch node 230 and the second branch node 235 for a plurality of individuals (e.g., potential customers that received an email sent at node 210). The database system may compare each respective outcome with, for example, metadata associated with the user. In some examples, the database system may determine a correlation (e.g., a relationship) between one or more characteristics of an individual and the outcome. For example, the database server may determine a relationship between calling a user at a certain time of day, and an increased likelihood of a desired outcome (e.g., that the individual purchases a product). Based on this relationship, in subsequent executions of the action node series 200, the dataset system may recommend either the first branch 220 or the second branch 225.

In the examples described herein, the action node series 200 is not limited to being integrated with any one particular external system. Scores, data, calculations, and the like may be obtained externally (e.g., external to the database system) and provided to the action node series 200 for its use.

Figure 3:
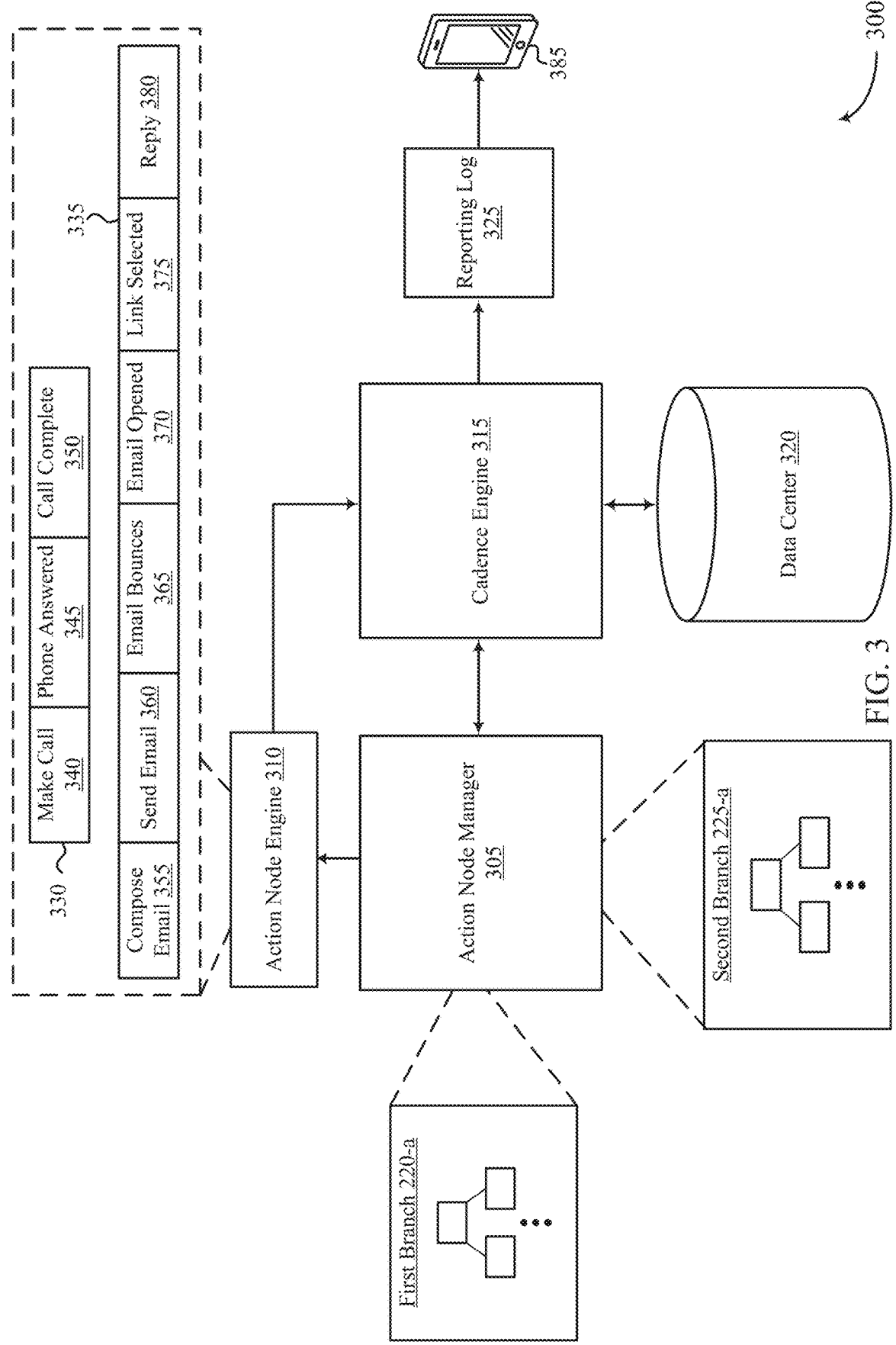
FIG. 3 illustrates an example of an action node series system that supports branched nodes in an action node series in accordance with aspects of the present disclosure.

FIG. 3 illustrates an example of an action node series system 300 that supports branched nodes in an action node series in accordance with aspects of the present disclosure. In some examples, the system 300 may include an action node manager 305, an action node engine 310, a cadence engine 315, a data center 320, and a reporting log 325. In some examples, the data center 320 may be an example of the data center 120 as described with reference to FIG. 1. In some examples, the action node manager 305 or the cadence engine 315 may support multiple branches, such as first branch 220 and second branch 225 as described with reference to FIG. 2. The action node series system 300 or at least some of its various components may be implemented in hardware, software executed by a processor, firmware, or any combination thereof. For example, the action node series system 300 may be implemented at a cloud client 105-a and may communicate with a data center 120 as described with reference to FIG. 1. As described herein, the components of the system 300 may recommend (e.g., to a user) and implement actions that are expected to best-optimize outcomes for both operators of a workflow and for end-users.

In some examples, the action node manager 305 may include or may be associated with one or more steps to be taken or implemented by a team. For example, a sales team may wish to engage with a potential list of customers by calling the customer, waiting a predetermined time, and then following up with an email. Thus, the action node manager 305 may monitor one or more branches (e.g., first branch 220-a or second branch 225-a, which may be examples for a first branch 220 and a second branch 225, respectively, as described with reference to FIG. 2). In some examples, the action node manager 305 may monitor one or more branches that have been completed, and which branches (e.g., which actions of a branch) are yet to be executed.

The action node manager 305 may communicate with the action node engine 310, which includes one or more actions in order to execute steps in a workflow. For example, action 330 may include the steps of placing a phone call 340 (e.g., to a potential customer), monitoring whether the phone call was answered 345, and indicating that the call was completed 345. The action node engine 310 may monitor each steps of the action 330 and may communicate the result (e.g., that the call was completed 350) to the cadence engine 315. In some examples, the action node engine 310 may communicate with action 335, which may include the steps of composing an email 355, sending the email 360, determining whether the email bounces 365, determining whether the email has been opened (e.g., viewed) 370, determining whether a link within the email has been selected (e.g., determining whether the email has been interacted with) 375, and determining whether a reply email has been sent 380. The action node engine 310 may monitor each steps of the action 335 and may communicate the result (e.g., that the call was completed 350) to the cadence engine 315. In some examples, the action node engine 310 may communicate the result of each portion of the respective action to the cadence engine 315. In other examples, the action node engine 310 may communicate the end result of a single action to the cadence engine 315.

As described herein, the action node engine 310 may communicate to the cadence engine 315 that an action (or a portion of an action) has occurred. In other examples, the action node engine 310 may communicate to the cadence engine 315 whether the action successfully occurred (e.g., whether the call was completed 350). Additionally or alternatively, the cadence engine 315 may be configured to indicate (e.g., to the action node manager 305) which action to select. For example, due to data privacy concerns, a potential customer may prefer to be contacted via a particular method (e.g., via a phone call, only). Thus the cadence engine 315 may be configured to "disable" one or more branch nodes for a particular client.

In some examples, the action node manager 305 may communicate with the action node engine 310 to contact a potential customer via an email. The action node engine 310 may, for example, indicate to a sales team a particular script to use when contacting a potential customer. In some examples, the script may be tailored to the potential customer based on one or more characteristics. For example, the call script may differ based on whether the potential customer is classified as a small business, or whether the potential customer is classified as an enterprise contact.

In some examples, the cadence engine 315 may assign a plurality of nodes to a respective branch at the action node manager 305. Each node may, for example, correspond to an action and a set of metadata associated with the action. In some examples, the cadence engine 315 may assign the plurality of nodes based on receiving an indication of a user input. For example, a user may indicate, via a user device, the plurality of nodes he or she wishes to add to an action node series at the action node manager 305. An indication of the user's selection (e.g., an indication of the plurality of nodes selected by a user) may be transmitted from the cadence engine 315 to the action node manager 305. Thus the action node manager 305 may communicate with the action node engine 310 based on the user's selection (e.g., based on data received from the cadence engine 315).

In some examples, one or more branch nodes at action node manager 305 may be defined based on data stored at the data center 320. For example, a branch node may define a plurality of branches that each includes a set of nodes and each set of nodes may include at least one different action, at least one different set of metadata associated with a same action, or both. Thus the different actions or the different sets of metadata may be stored at the data center 320 and may be communicated to the action node manager 305 (e.g., based on one or more nodes selected by a user).

As described herein, the cadence engine 315 may assign at least one node based on receiving an indication of a user input. For example, a user may indicate, via a user device, which node or nodes he or she wishes to be a branch node. In some examples, the branch node(s) may be indicated by a user (e.g., a sales manager) and in other examples, the branch node(s) may be indicated based on an occurrence or non-occurrence of an event (e.g., based on a new potential customer being added to the data center 320). An indication of the user's selection (e.g., an indication of the branch node or nodes selected) may be transmitted to the action node manager 305, which may implement one or more branch nodes (e.g., first branch 220-a or second branch 225-a). Stated another way, based on receiving an indication of one or more branch nodes, the action node manager 305 may selectively communicate with the action node engine 310 to interact with a customer.

Based on the cadence engine 315 communicating with the action node manager 305, the action node manager 305 may execute the action node series. At any period during the execution of the action node series (e.g., after a first call has been made or after a first email has been sent), the cadence engine 315 may update the action node series by adding, removing, or modifying one or more branch nodes. For example, the cadence engine 315 may add, remove, or modify a branch node, or may end an action node series, based on the passing of a predefined time. For example, if a potential customer has not responded to an email after a predefined time (e.g., 7 days) then the cadence engine 315 may modify a respective branch by transmitting an indication to the action node manager 305. In some examples, after executing the action node series, the cadence engine 315 may transmit an indication of the outcome to the reporting log 325. In some examples, the contents of the reporting log 325 may be viewable by or transmitted to a user device 385. Thus, in some examples, a user device 385 may receive an indication of the outcome of the action node series performed by the system 300.

Figure 4:
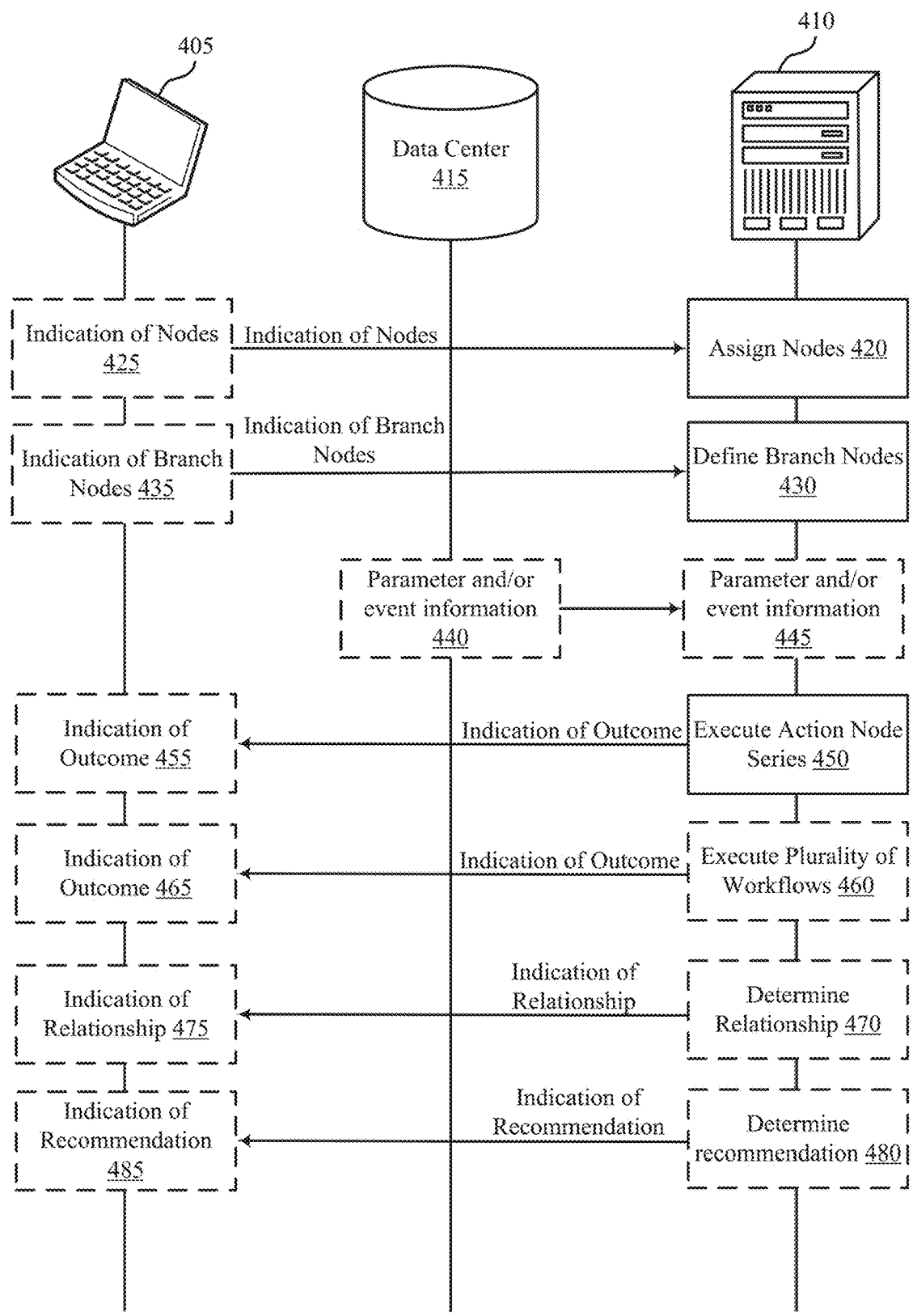
FIG. 4 illustrates an example of a data flow diagram that supports branched nodes in an action node series in accordance with aspects of the present disclosure.

FIG. 4 illustrates an example of a data flow diagram 400 that supports branched nodes in an action node series in accordance with aspects of the present disclosure. The data flow diagram 400 includes a user device 405, which may be an example of a cloud client 105 as described in FIG. 1; a database system 410, which may be an example of the server 105-a as described with reference to FIG. 1; and a data center 415, which may be an example of data center 120 as described with reference to FIG. 1.

At 420, the database system 410 may assign a plurality of nodes to the action node series. In some examples, each node of the plurality of nodes may correspond to an action and a set of metadata associated with the action. In some examples, the database system 410 may assign the plurality of nodes based on receiving an indication of a user input. For example, a user may indicate, via a user device 405, the plurality of nodes he or she wishes to add to an action node series. At 425 an indication of the user's selection (e.g., an indication of the plurality of nodes selected by a user) may be transmitted to the database system 410. Thus, in some examples, the database system 410 may assign the plurality of nodes to the action node series based on receiving the indication of the user's selection.

At 430, the database system 410 may define at least one node of the plurality of nodes as a branch node. In some examples, a branch node may define a plurality of branches that each includes a set (e.g., a subset) of nodes. In some examples, each set of nodes may include at least one different action (e.g., different than an action of the nodes assigned at 420), at least one different set of metadata associated with a same action, or both. In some examples, the branch node may include logic (e.g., programmed logic for declarative programming) programmed for selecting a branch based at least in part on an occurrence of an event, a value of a parameter, or both.

In some examples, the database system 410 may define the at least one node of the plurality of nodes as a branch node based on receiving an indication of a user input. For example, a user may indicate, via a user device 405, which node or nodes he or she wishes to be a branch node. At 435 an indication of the user's selection (e.g., an indication of the branch node or nodes selected by a user) may be transmitted to the database system 410. Thus, in some examples, the database system 410 may define at least one node of the plurality of nodes as a branch node based on receiving the indication of the user's selection.

In some examples, at 445, the database system 410 may receive information indicative of the occurrence of the event or the value of the parameter from a system that is separate from the database system 410. In some examples, the information may be received from the data center 415. Stated another way, at 440, the data center 415 may transmit information indicative of the occurrence of the event or the value of the parameter to the database system 410. In some examples, the system that is separate from the database system 410 may be or may include an application or program (e.g., an email program, a task tracking program, a phone dialing program, a scheduling program, or the like), or may be or may include a platform such as Salesforce Einstein® or Salesforce Lightning®, or may be or may include data such as a Salesforce Einstein® lead score.

At 450, the database system 410 may execute the action node series on the database system 410. In some examples, an outcome of the action node series is based at least in part on the occurrence of the event or the value of the parameter. In some examples, after executing the action node series, the database system 410 may transmit an indication of the outcome to a user device 405. Thus, in some examples, the user device 405 may receive an indication of the outcome at 455.

At 460, the database system 410 may execute the action node series for a plurality of occurrences. In some examples, the action node series may proceed along a first branch of the plurality of branches for a first subset of the plurality of occurrences. And in some examples, the action node series may proceed along a second branch of the plurality of branches for a second subset of the plurality of occurrences. In some examples, after executing the action node series for the plurality of occurrences, the database system 410 may transmit an indication of the outcome to a user device 405. Thus, in some examples, the user device 405 may receive an indication of the outcome for the plurality of occurrences at 465.

At 470, the database system 410 may determine a relationship between an outcome set of the first and second subsets of the plurality of occurrences and the first and second branches of the plurality. In some examples, after determining the relationship, the database system 410 may transmit an indication of the determined relationship to a user device 405. Thus, in some examples, the user device 405 may receive an indication of the determined relationship at 475.

At 480, the database system 410 may determine a recommendation of the first branch or the second branch. Stated another way, at 480, the database system 410 may recommend either the first branch or the second branch to a user (e.g., to user device 405) based on determining the relationship (e.g., at 470). In some examples, after determining the recommendation, the database system 410 may transmit an indication of the recommendation to a user device 405. Thus, in some examples, the user device 405 may receive an indication of the determined recommendation at 485.

Figure 5:
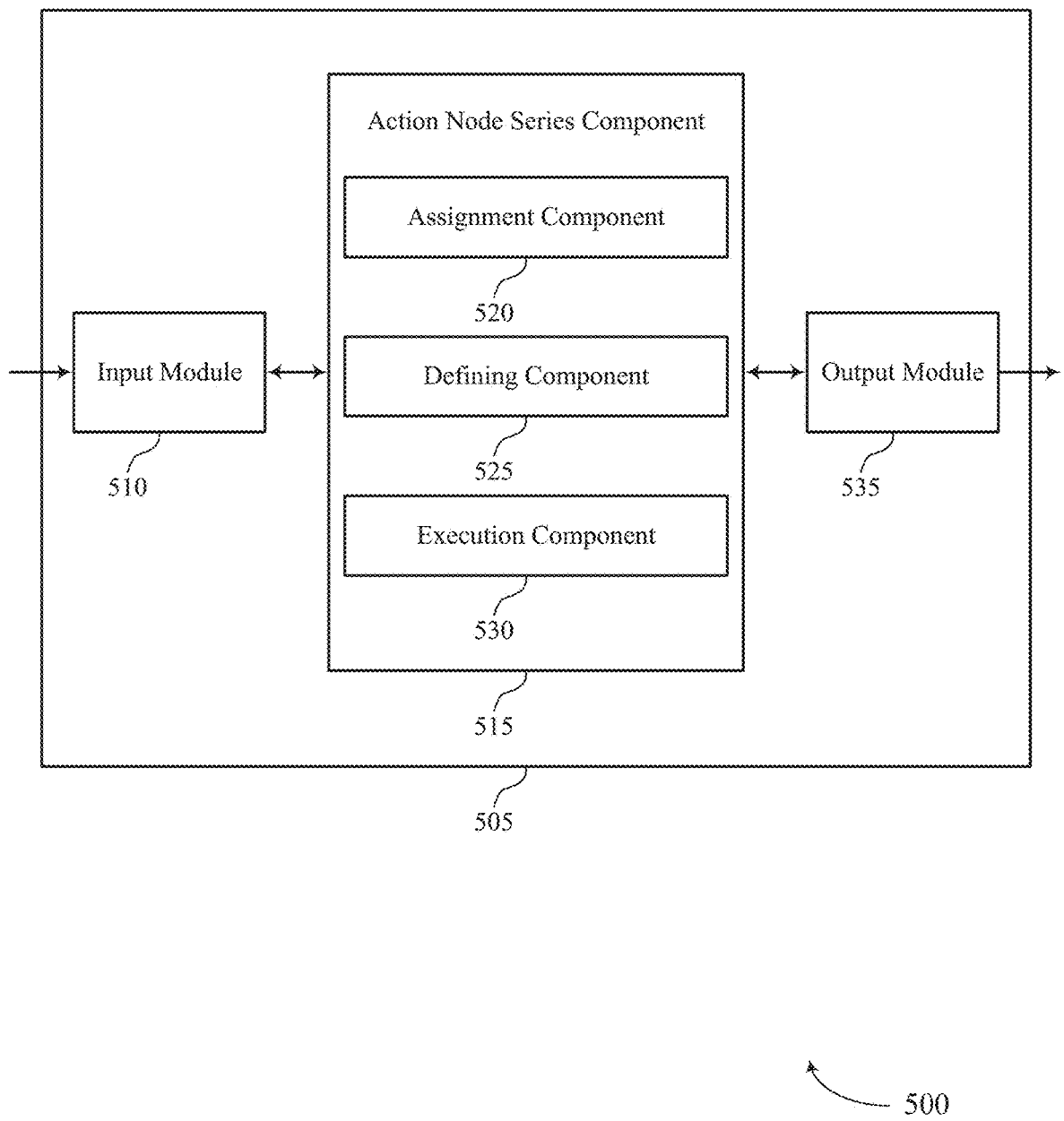
FIG. 5 shows a block diagram of an apparatus that supports branched nodes in an action node series in accordance with aspects of the present disclosure.

FIG. 5 shows a block diagram 500 of an apparatus 505 that supports branched nodes in an action node series in accordance with aspects of the present disclosure. The apparatus 505 may include an input module 510, an action node series component 515, and an output module 535. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the action node series component 515 to support branched nodes in an action node series. In some cases, the input module 510 may be a component of an input/output (I/O) controller 715 as described with reference to FIG. 7.

The workflow action node series component 515 may include an assignment component 520, a defining component 525, and an execution component 530. The action node series component 515 may be an example of aspects of the action node series component 605 or 710 described with reference to FIGS. 6 and 7.

The action node series component 515 and/or at least some of its various sub-components may be implemented in hardware, software executed by a processor, firmware, or any combination thereof. If implemented in software executed by a processor, the functions of the action node series component 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The action node series component 515 and/or at least some of its various sub-components may be physically located at various positions, including being distributed such that portions of functions are implemented at different physical locations by one or more physical devices. In some examples, the action node series component 515 and/or at least some of its various sub-components may be a separate and distinct component in accordance with various aspects of the present disclosure. In other examples, the action node series component 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The assignment component 520 may assign a plurality of nodes to the action node series, wherein each node of the action node series corresponds to an action and a set of metadata associated with the action.

The defining component 525 may define at least one node of the action node series as a branch node, wherein the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both.

The execution component 530 execute the action node series on the database system, wherein an outcome of the action node series is based at least in part on the occurrence of the event or the value of the parameter.

The output module 535 may manage output signals for the apparatus 505. For example, the output module 535 may receive signals from other components of the apparatus 505, such as the action node series component 515, and may transmit these signals to other components or devices. In some specific examples, the output module 535 may transmit output signals for display in a user interface, for storage in a database or data store, for further processing at a server or server cluster, or for any other processes at any number of devices or systems. In some cases, the output module 535 may be a component of an I/O controller 715 as described with reference to FIG. 7.

Figure 6:
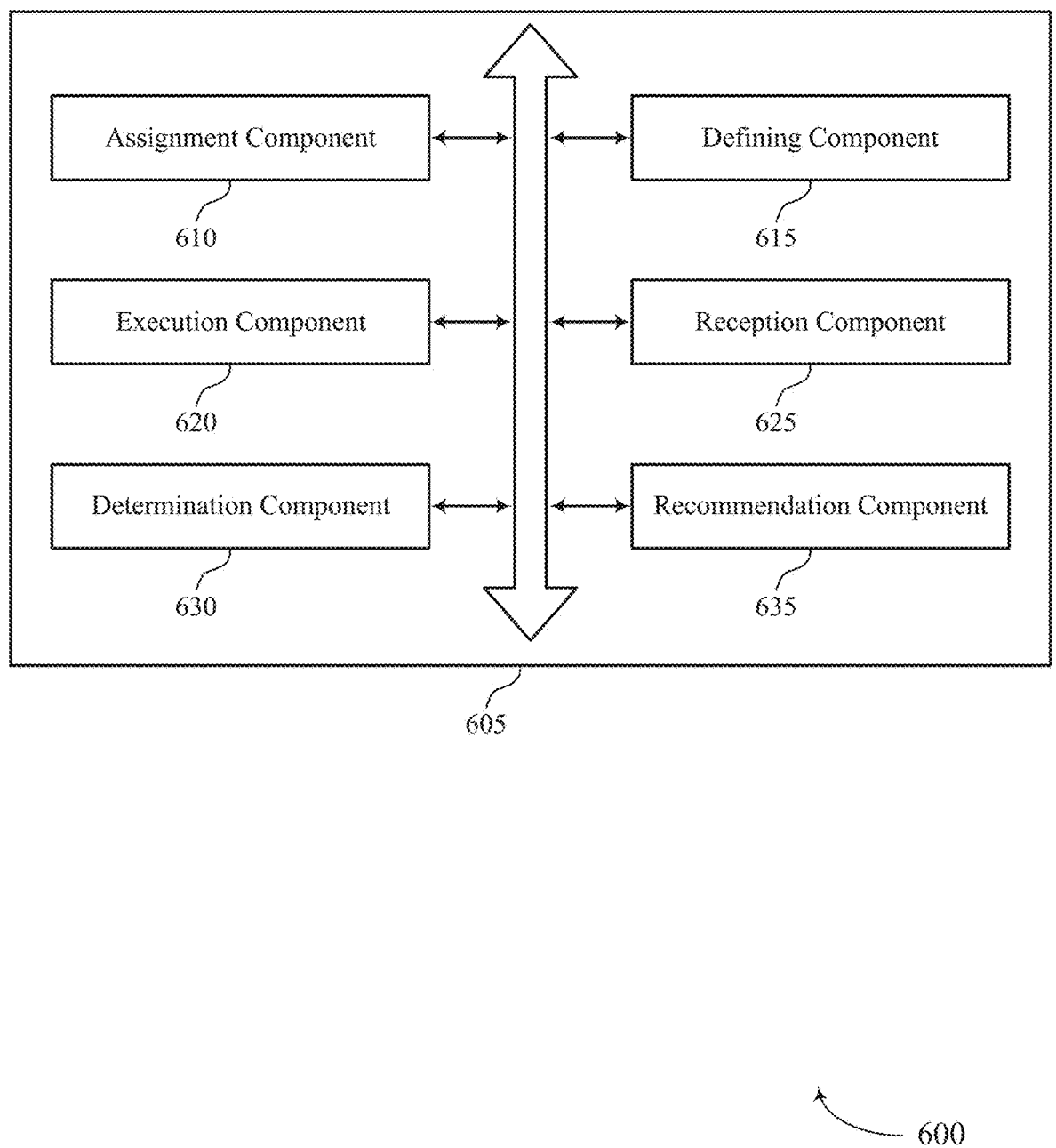
FIG. 6 shows a block diagram of an action node series component that supports branched nodes in an action node series in accordance with aspects of the present disclosure.

FIG. 6 shows a block diagram 600 of an action node series component 605 that supports branched nodes in an action node series in accordance with aspects of the present disclosure. The action node series component 605 may be an example of aspects of an action node series component 515 or an action node series component 710 described herein. The action node series component 605 may include an assignment component 610, a defining component 615, an execution component 620, a reception component 625, a determination component 630, and a recommendation component 635. Each of these modules may communicate, directly or indirectly, with one another (e.g., via one or more buses).

The assignment component 610 may assign a plurality of nodes to the action node series, wherein each node of the action node series corresponds to an action and a set of metadata associated with the action.

The defining component 615 may define at least one node of the action node series as a branch node, wherein the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both.

The execution component 620 may execute the action node series on the database system, wherein an outcome of the action node series is based at least in part on the occurrence of the event or the value of the parameter. In some examples, the execution component 620 may execute the action node series for a plurality of occurrences, wherein the action node series proceeds along a branch of the plurality of branches for a first subset of the plurality of occurrences, and wherein the action node series proceeds along a second branch of the plurality of branches for a second subset of the plurality of occurrences.

The reception component 625 may receive information indicative of the occurrence of the event or the value of the parameter from a system that is separate from the database system.

The determination component 630 may determine a relationship between an outcome set of the first and second subsets of the plurality of occurrences and the first and second branches of the plurality of branches.

The recommendation component 635 may recommend either the first branch or the second branch to a user of the action node series based at least part on the determining.

Figure 7:
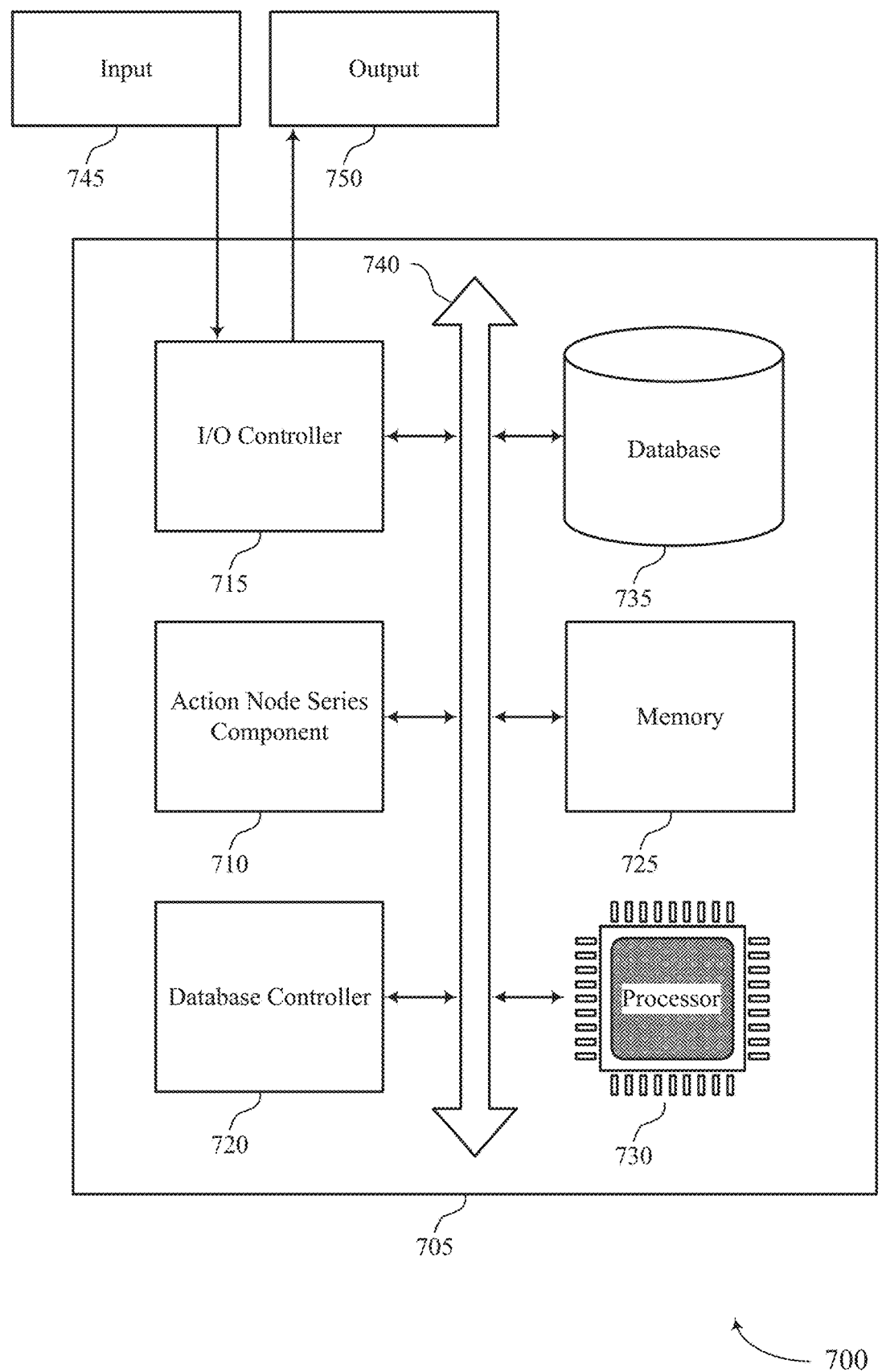
FIG. 7 shows a diagram of a system including a device that supports branched nodes in an action node series in accordance with aspects of the present disclosure.

FIG. 7 shows a diagram of a system 700 including a device 705 that supports branched nodes in an action node series in accordance with aspects of the present disclosure. The device 705 may be an example of or include the components of an analytical data store or an apparatus as described herein. The device 705 may include components for bi-directional data communications including components for transmitting and receiving communications, including an action node series component 710, an I/O controller 715, a database controller 720, memory 725, a processor 730, and a database 735. These components may be in electronic communication via one or more buses (e.g., bus 740).

The action node series component 710 may be an example of an action node series component 515 or 605 as described herein. For example, the action node series component 710 may perform any of the methods or processes described herein with reference to FIGS. 5 and 6. In some cases, the action node series component 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting branched nodes in an action node series).

Figure 8:
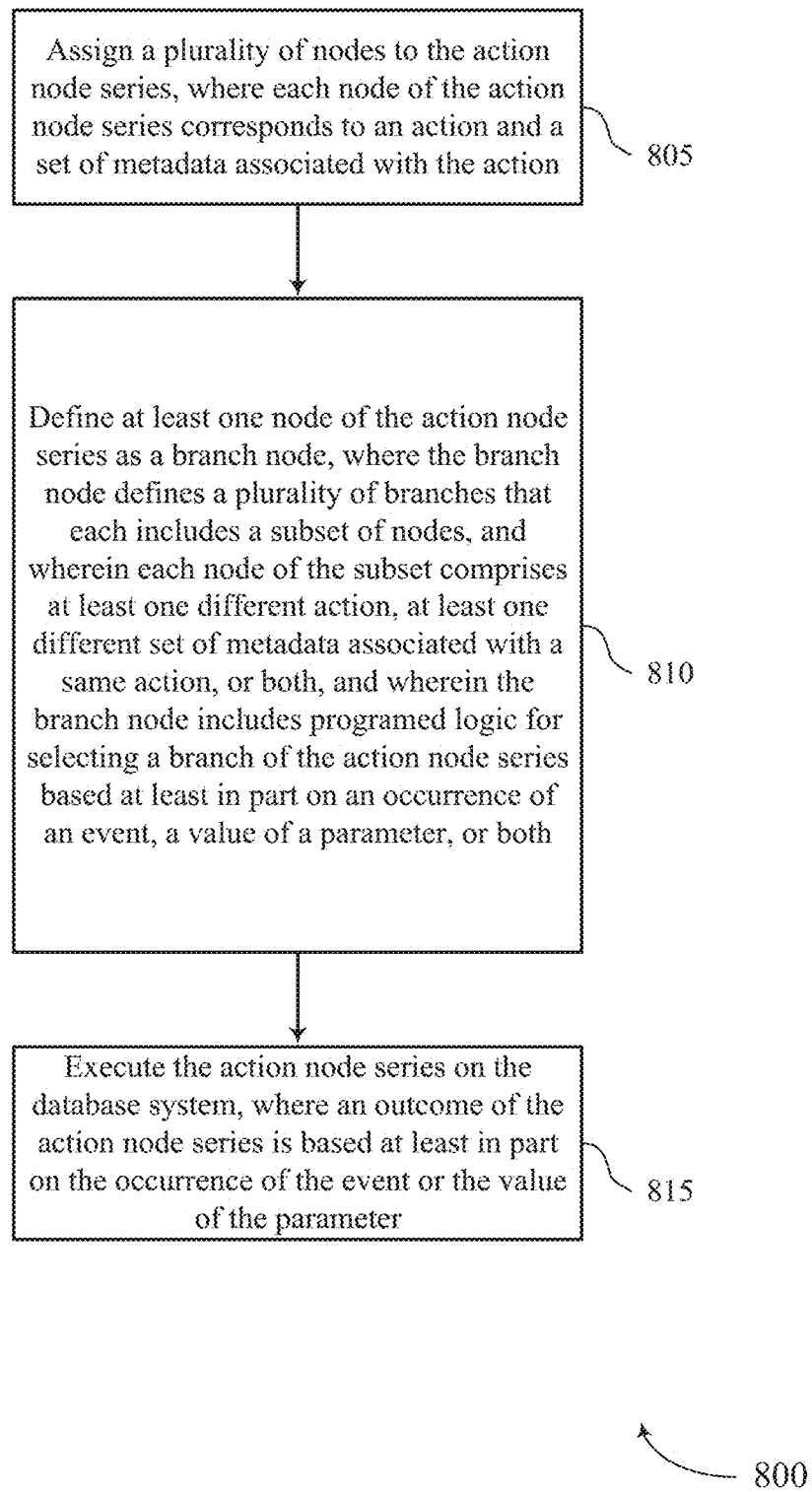
FIGS. 8 through 12 show flowcharts illustrating methods that support branched nodes in an action node series in accordance with aspects of the present disclosure.

FIG. 8 shows a flowchart illustrating a method 800 that supports branched nodes in an action node series in accordance with aspects of the present disclosure. The operations of method 800 may be implemented by a database system or its components as described herein. For example, the operations of method 800 may be performed by a workflow component as described with reference to FIGS. 5 through 7. In some examples, a database system may execute a set of instructions to control the functional elements of the database system to perform the functions described below. Additionally or alternatively, a database system may perform aspects of the functions described below using special-purpose hardware.

At 805, the database system may assign a plurality of nodes to the action node series, where each node of the action node series corresponds to an action and a set of metadata associated with the action. The operations of 805 may be performed according to the methods described herein. In some examples, aspects of the operations of 805 may be performed by an assignment component as described with reference to FIGS. 5 and 6.

At 810, the database system may define at least one node of the action node series as a branch node, where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both. The operations of 810 may be performed according to the methods described herein. In some examples, aspects of the operations of 810 may be performed by a defining component as described with reference to FIGS. 5 and 6.

At 815, the database system may execute the action node series on the database system, where an outcome of the action node series is based at least in part on the occurrence of the event or the value of the parameter. The operations of 815 may be performed according to the methods described herein. In some examples, aspects of the operations of 815 may be performed by an execution component as described with reference to FIGS. 5 and 6.

Figure 9:
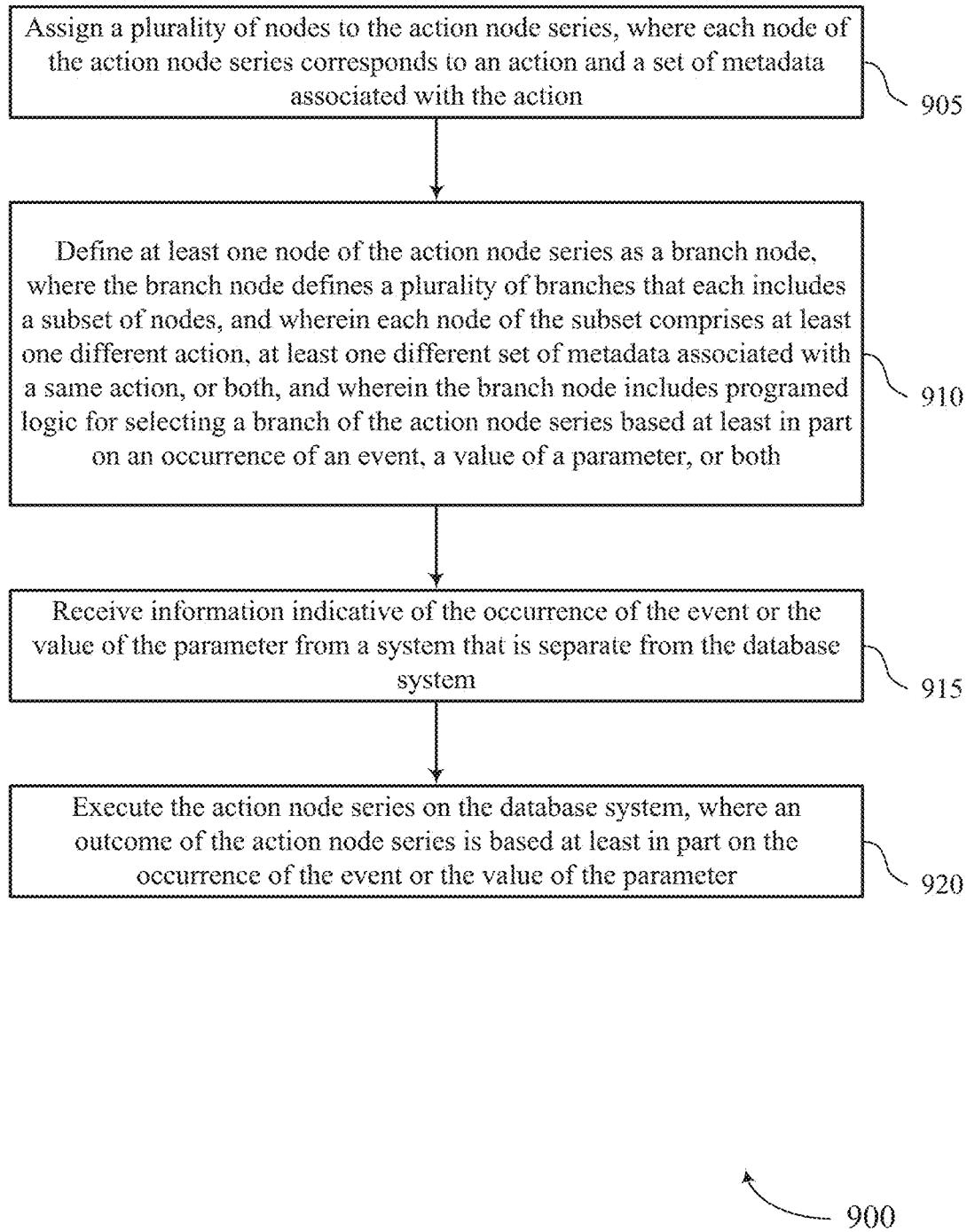

FIG. 9 shows a flowchart illustrating a method 900 that supports branched nodes in an action node series in accordance with aspects of the present disclosure. The operations of method 900 may be implemented by a database system or its components as described herein. For example, the operations of method 900 may be performed by a workflow component as described with reference to FIGS. 5 through 7. In some examples, a database system may execute a set of instructions to control the functional elements of the database system to perform the functions described below. Additionally or alternatively, a database system may perform aspects of the functions described below using special-purpose hardware.

At 905, the database system may assign a plurality of nodes to the action node series, where each node of the action node series corresponds to an action and a set of metadata associated with the action. The operations of 905 may be performed according to the methods described herein. In some examples, aspects of the operations of 905 may be performed by an assignment component as described with reference to FIGS. 5 and 6.

At 910, the database system may define at least one node of the action node series as a branch node, where the branch node defines a set of workflow branches that each includes a set of nodes, and where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both. The operations of 910 may be performed according to the methods described herein. In some examples, aspects of the operations of 910 may be performed by a defining component as described with reference to FIGS. 5 and 6.

At 915, the database system may receive information indicative of the occurrence of the event or the value of the parameter from a system that is separate from the database system. The operations of 915 may be performed according to the methods described herein. In some examples, aspects of the operations of 915 may be performed by a reception component as described with reference to FIGS. 5 and 6.

At 920, the database system may execute the action node series on the database system, where an outcome of the action node series is based at least in part on the occurrence of the event or the value of the parameter. The operations of 920 may be performed according to the methods described herein. In some examples, aspects of the operations of 920 may be performed by an execution component as described with reference to FIGS. 5 and 6.

Figure 10:
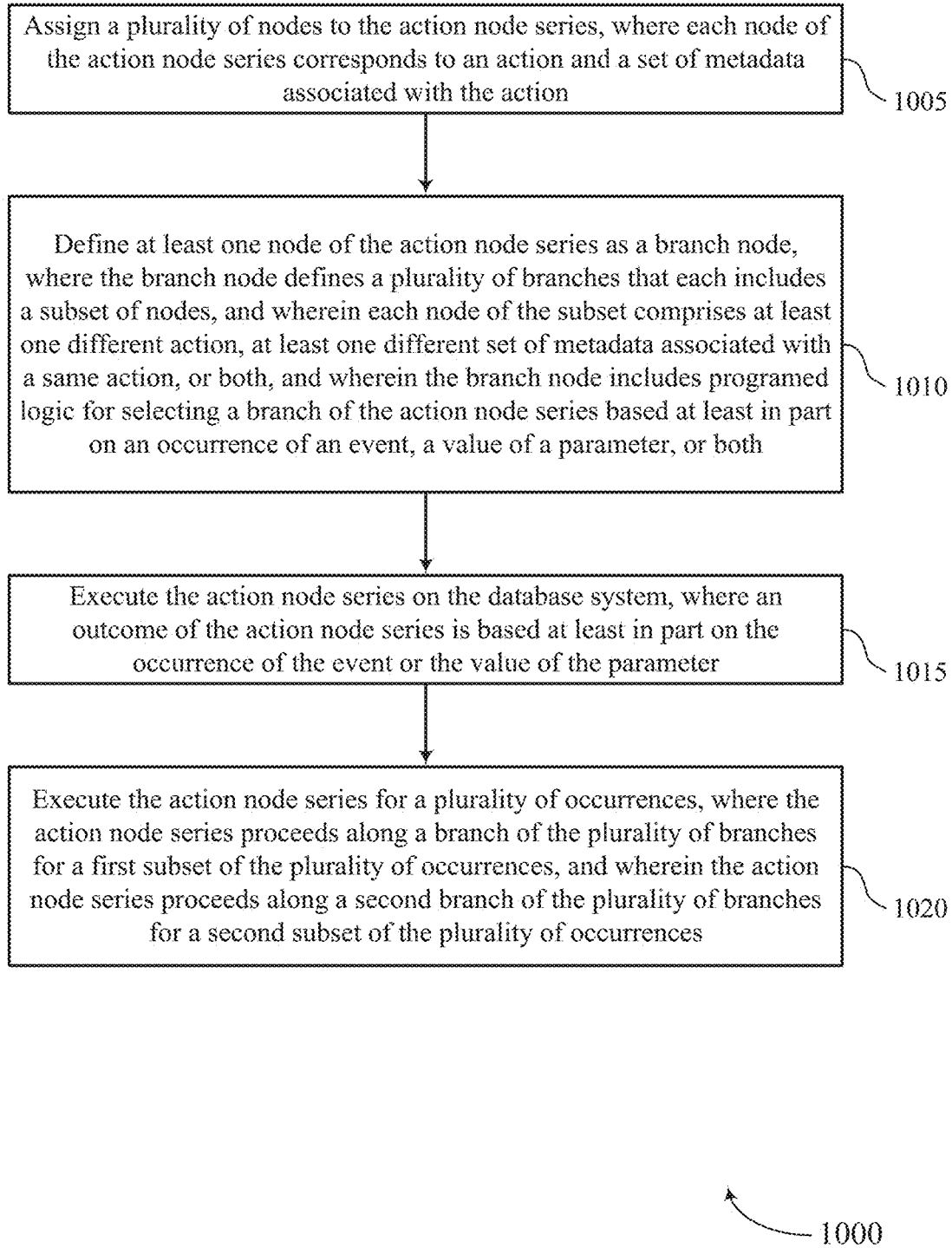

FIG. 10 shows a flowchart illustrating a method 1000 that supports branched nodes in an action node series in accordance with aspects of the present disclosure. The operations of method 1000 may be implemented by a database system or its components as described herein. For example, the operations of method 1000 may be performed by a workflow component as described with reference to FIGS. 5 through 7. In some examples, a database system may execute a set of instructions to control the functional elements of the database system to perform the functions described below. Additionally or alternatively, a database system may perform aspects of the functions described below using special-purpose hardware.

At 1005, the database system may assign a plurality of nodes to the action node series, where each node of the action node series corresponds to an action and a set of metadata associated with the action. The operations of 1005 may be performed according to the methods described herein. In some examples, aspects of the operations of 1005 may be performed by an assignment component as described with reference to FIGS. 5 and 6.

At 1010, the database system may define at least one node of the action node series as a branch node, where the branch node defines a set of workflow branches that each includes a set of nodes, and where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both. The operations of 1010 may be performed according to the methods described herein. In some examples, aspects of the operations of 1010 may be performed by a defining component as described with reference to FIGS. 5 and 6.

At 1015, the database system may execute the action node series on the database system, where an outcome of the action node series is based at least in part on the occurrence of the event or the value of the parameter. The operations of 1015 may be performed according to the methods described herein. In some examples, aspects of the operations of 1015 may be performed by an execution component as described with reference to FIGS. 5 and 6.

At 1020, the database system may execute the action node series for a plurality of occurrences, the action node series proceeds along a branch of the plurality of branches for a first subset of the plurality of occurrences, and wherein the action node series proceeds along a second branch of the plurality of branches for a second subset of the plurality of occurrences. The operations of 1020 may be performed according to the methods described herein. In some examples, aspects of the operations of 1020 may be performed by an execution component as described with reference to FIGS. 5 and 6.

Figure 11:
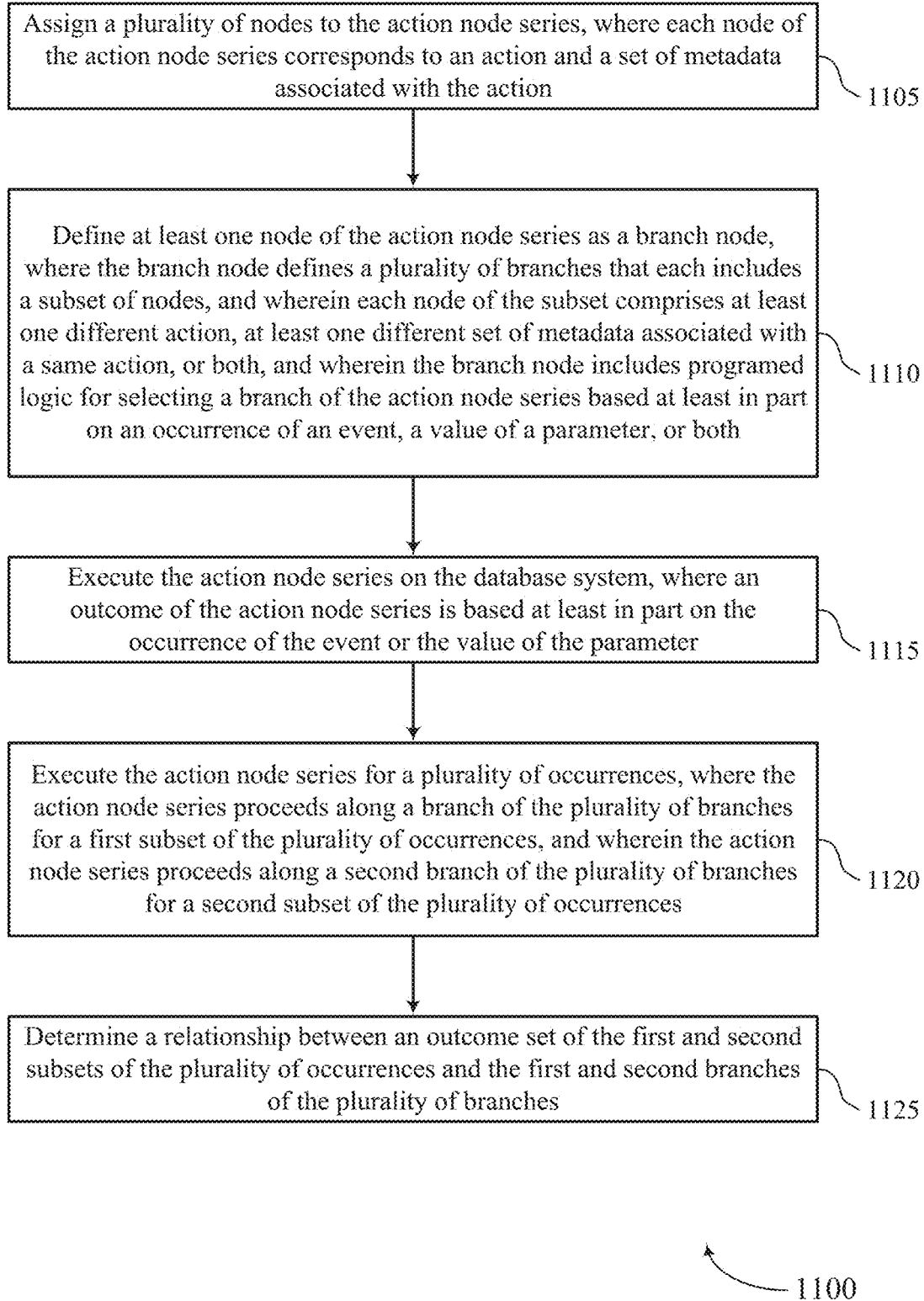

FIG. 11 shows a flowchart illustrating a method 1100 that supports branched nodes in an action node series in accordance with aspects of the present disclosure. The operations of method 1100 may be implemented by a database system or its components as described herein. For example, the operations of method 1100 may be performed by a workflow component as described with reference to FIGS. 5 through 7. In some examples, a database system may execute a set of instructions to control the functional elements of the database system to perform the functions described below. Additionally or alternatively, a database system may perform aspects of the functions described below using special-purpose hardware.

At 1105, the database system may assign a plurality of nodes to the action node series, where each node of the action node series corresponds to an action and a set of metadata associated with the action. The operations of 1105 may be performed according to the methods described herein. In some examples, aspects of the operations of 1105 may be performed by an assignment component as described with reference to FIGS. 5 and 6.

At 1110, the database system may define at least one node of the action node series as a branch node, where the branch node defines a set of workflow branches that each includes a set of nodes, and the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both. The operations of 1110 may be performed according to the methods described herein. In some examples, aspects of the operations of 1110 may be performed by a defining component as described with reference to FIGS. 5 and 6.

At 1115, the database system may execute the action node series on the database system, where an outcome of the action node series is based at least in part on the occurrence of the event or the value of the parameter. The operations of 1115 may be performed according to the methods described herein. In some examples, aspects of the operations of 1115 may be performed by an execution component as described with reference to FIGS. 5 and 6.

At 1120, the database system may execute the action node series for a plurality of occurrences, where the action node series proceeds along a branch of the plurality of branches for a first subset of the plurality of occurrences, and wherein the action node series proceeds along a second branch of the plurality of branches for a second subset of the plurality of occurrences. The operations of 1120 may be performed according to the methods described herein. In some examples, aspects of the operations of 1120 may be performed by an execution component as described with reference to FIGS. 5 and 6.

At 1125, the database system may determine a relationship between an outcome set of the first and second subsets of the plurality of occurrences and the first and second branches of the plurality of branches. The operations of 1125 may be performed according to the methods described herein. In some examples, aspects of the operations of 1025 may be performed by a determination component as described with reference to FIGS. 5 and 6.

Figure 12:
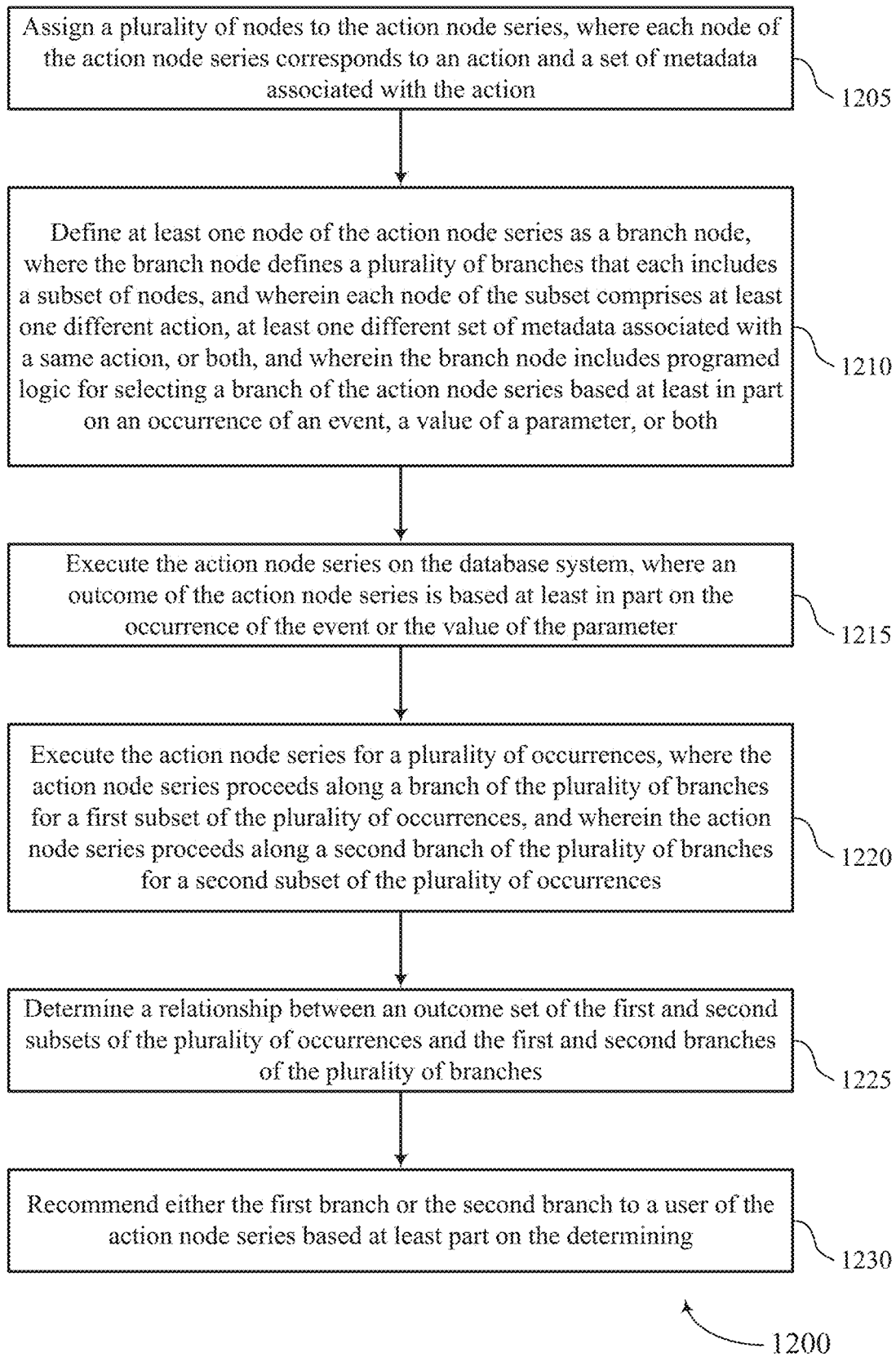

FIG. 12 shows a flowchart illustrating a method 1200 that supports branched nodes in an action node series in accordance with aspects of the present disclosure. The operations of method 1200 may be implemented by a database system or its components as described herein. For example, the operations of method 1200 may be performed by a workflow component as described with reference to FIGS. 5 through 7. In some examples, a database system may execute a set of instructions to control the functional elements of the database system to perform the functions described below. Additionally or alternatively, a database system may perform aspects of the functions described below using special-purpose hardware.

At 1205, the database system may assign a plurality of nodes to the action node series, where each node of the action node series corresponds to an action and a set of metadata associated with the action. The operations of 1205 may be performed according to the methods described herein. In some examples, aspects of the operations of 1205 may be performed by an assignment component as described with reference to FIGS. 5 and 6.

At 1210, the database system may define at least one node of the action node series as a branch node, where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both. The operations of 1210 may be performed according to the methods described herein. In some examples, aspects of the operations of 1210 may be performed by a defining component as described with reference to FIGS. 5 and 6.

At 1215, the database system may execute the action node series on the database system, where an outcome of the action node series is based at least in part on the occurrence of the event or the value of the parameter. The operations of 1215 may be performed according to the methods described herein. In some examples, aspects of the operations of 1215 may be performed by an execution component as described with reference to FIGS. 5 and 6.

At 1220, the database system may execute the action node series for a plurality of occurrences, where the action node series proceeds along a branch of the plurality of branches for a first subset of the plurality of occurrences, and wherein the action node series proceeds along a second branch of the plurality of branches for a second subset of the plurality of occurrences. The operations of 1220 may be performed according to the methods described herein. In some examples, aspects of the operations of 1220 may be performed by an execution component as described with reference to FIGS. 5 and 6.

At 1225, the database system may determine a relationship between an outcome set of the first and second subsets of the plurality of occurrences and the first and second branches of the plurality of branches. The operations of 1225 may be performed according to the methods described herein. In some examples, aspects of the operations of 1225 may be performed by a determination component as described with reference to FIGS. 5 and 6.

At 1230, the database system may recommend either the first branch or the second branch to a user of the action node series based at least part on the determining. The operations of 1230 may be performed according to the methods described herein. In some examples, aspects of the operations of 1230 may be performed by a recommendation component as described with reference to FIGS. 5 and 6.

A method of defining an action node series at a database system is described. The method may include assigning a plurality of nodes to the action node series, where each node of the action node series corresponds to an action and a set of metadata associated with the action, defining at least one node of the action node series as a branch node, where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both, and executing the action node series on the database system, where an outcome of the action node series is based at least in part on the occurrence of the event or the value of the parameter.

An apparatus for defining an action node series at a database system is described. The apparatus may include a processor, memory in electronic communication with the processor, and instructions stored in the memory. The instructions may be executable by the processor to cause the apparatus to assign a plurality of nodes to the action node series, where each node of the action node series corresponds to an action and a set of metadata associated with the action, define at least one node of the action node series as a branch node, where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both, and execute the action node series on the database system, where an outcome of the action node series is based at least in part on the occurrence of the event or the value of the parameter.

Another apparatus for defining an action node series at a database system is described. The apparatus may include means for assigning a plurality of nodes to the action node series, where each node of the action node series corresponds to an action and a set of metadata associated with the action, defining at least one node of the action node series as a branch node, where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both, and executing the action node series on the database system, where an outcome of the action node series is based at least in part on the occurrence of the event or the value of the parameter.

A non-transitory computer-readable medium storing code for defining an action node series at a database system is described. The code may include instructions executable by a processor to assign a plurality of nodes to the action node series, where each node of the action node series corresponds to an action and a set of metadata associated with the action, define at least one node of the action node series as a branch node, where the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both, and execute the action node series on the database system, where an outcome of the action node series is based at least in part on the occurrence of the event or the value of the parameter.

Some examples of the method, apparatuses, and non-transitory computer-readable medium described herein may further include operations, features, means, or instructions for receiving information indicative of the occurrence of the event or the value of the parameter from a system that is separate from the database system.

Some examples of the method, apparatuses, and non-transitory computer-readable medium described herein may further include operations, features, means, or instructions for executing the action node series for a plurality of occurrences, where the action node series proceeds along a branch of the plurality of branches for a first subset of the plurality of occurrences, and wherein the action node series proceeds along a second branch of the plurality of branches for a second subset of the plurality of occurrences.

Some examples of the method, apparatuses, and non-transitory computer-readable medium described herein may further include operations, features, means, or instructions for determining a relationship between an outcome set of the first and second subsets of the plurality of occurrences and the first and second branches of the plurality of branches.

Some examples of the method, apparatuses, and non-transitory computer-readable medium described herein may further include operations, features, means, or instructions for recommending either the first branch or the second branch to a user of the action node series based at least part on the determining.

In some examples of the method, apparatuses, and non-transitory computer-readable medium described herein, the programmed logic is configured for declarative programming.

In some examples of the method, apparatuses, and non-transitory computer-readable medium described herein, the action comprises making a phone call, sending an electronic message, waiting a predetermined amount of time, exiting the action node series, or a combination thereof.

In some examples of the method, apparatuses, and non-transitory computer-readable medium described herein, the set of metadata associated with the action comprises an identity of a person associated with the action, contact information associated with the person associated with the action, a template of text associated with the action, a duration associated with the action, or a combination thereof.

In some examples of the method, apparatuses, and non-transitory computer-readable medium described herein, the occurrence of the event comprises whether a phone call was returned, whether an electronic message was returned, whether a user engaged with electronic customer material, or a combination thereof.

In some examples of the method, apparatuses, and non-transitory computer-readable medium described herein, the at least one different action associated with the nodes corresponding to each of the plurality of branches is configurable.

In some examples of the method, apparatuses, and non-transitory computer-readable medium described herein, the at least one different action is configurable based at least in part on a portion of the action node series on the database system being executed.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for defining an action node series at a database system, comprising:
   assigning a plurality of nodes to the action node series, wherein each node of the action node series corresponds to an action and a set of metadata associated with the action;
   defining at least one node of the action node series as a branch node, wherein the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both;
   receiving information indicative of the occurrence of the event or the value of the parameter from a system that is separate from the database system;
   executing the action node series on the database system, wherein an outcome of the action node series is based at least in part on the occurrence of the event or the value of the parameter; and
   executing the action node series for a plurality of occurrences, wherein the action node series proceeds along a branch of the plurality of branches for a first subset of the plurality of occurrences, and wherein the action node series proceeds along a second branch of the plurality of branches for a second subset of the plurality of occurrences.

2. The method of claim 1, further comprising: determining a relationship between an outcome set of the first and second subsets of the plurality of occurrences and the first and second branches of the plurality of branches.

3. The method of claim 2, further comprising:
   recommending either the first branch or the second branch to a user of the action node series based at least part on the determining.

4. The method of claim 1, wherein the programmed logic is configured for declarative programming.

5. The method of claim 1, wherein the action comprises making a phone call, sending an electronic message, waiting a predetermined amount of time, exiting the action node series, or a combination thereof.

6. The method of claim 1, wherein the set of metadata associated with the action comprises an identity of a person associated with the action, contact information associated with the person associated with the action, a template of text associated with the action, a duration associated with the action, or a combination thereof.

7. The method of claim 1, wherein the occurrence of the event comprises whether a phone call was returned, whether an electronic message was returned, whether a user engaged with electronic customer material, or a combination thereof.

8. The method of claim 1, wherein the at least one different action associated with the nodes corresponding to each of the plurality of branches is configurable.

9. The method of claim 8, wherein the at least one different action is configurable based at least in part on a portion of the action node series on the database system being executed.

10. An apparatus for defining an action node series at a database system, comprising:
    a processor, memory in electronic communication with the processor; and
    instructions stored in the memory and executable by the processor to cause the apparatus to:
    assign a plurality of nodes to the action node series, wherein each node of the action node series corresponds to an action and a set of metadata associated with the action;
    define at least one node of the action node series as a branch node, wherein the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both;
    receive information indicative of the occurrence of the event or the value of the parameter from a system that is separate from the database system;
    execute the action node series on the database system, wherein an outcome at the action node series is based at least in part on the occurrence of the event or the value of the parameter; and
    execute the action node series for a plurality of occurrences, wherein the subset of the plurality of occurrences, and wherein the action node series proceeds plurality of occurrences.

11. The apparatus of claim 10, wherein the instructions are further executable by the processor to cause the apparatus to: determine a relationship between an outcome set of the first and second subsets at the plurality of occurrences and the first and second branches of the plurality of branches.

12. The apparatus of claim 11, wherein the instructions are further executable by the processor to cause the apparatus to:
    recommend either the first branch or the second branch to a user of the action node series based at least part on the determining.

13. The apparatus of claim 10, wherein the programmed logic is configured for declarative programming.

14. The apparatus of claim 10, wherein the action comprises making a phone call, sending an electronic message, waiting a predetermined amount of time, exiting the action node series, or a combination thereof.

15. The apparatus of claim 10, wherein the set of metadata associated with the action comprises an identity of a person associated with the action, contact information associated with the person associated with the action, a template of text associated with the action, a duration associated with the action, or a combination thereof.

16. A non-transitory computer-readable medium storing code for defining an action node series at a database system, the code comprising instructions executable by a processor to:
- assign a plurality of nodes to the action node series, wherein each node of the action node series corresponds to an action and a set of metadata associated with the action;
- define at least one node of the action node series as a branch node, wherein the branch node defines a plurality of branches that each includes a subset of nodes, and wherein each node of the subset comprises at least one different action, at least one different set of metadata associated with a same action, or both, and wherein the branch node includes programmed logic for selecting a branch of the action node series based at least in part on an occurrence of an event, a value of a parameter, or both;
- receive information indicative of the occurrence of the event or the value of the parameter from a system that is separate from the database system;
- execute the action node series on the database system, wherein an outcome of the action node series is based at least in part on the occurrence of the event or the value of the parameter; and
- execute the action node series for a plurality of occurrences, wherein the action node series proceeds along a branch of the plurality of branches for a first subset of the plurality of occurrences, and wherein the action node series proceeds along a second branch of the plurality of branches for a second subset of the plurality of occurrences.

* * * * *

UNITED STATES PATENT AND TRADEMARK OFFICE
CERTIFICATE OF CORRECTION

PATENT NO.         : 10,708,388 B2
APPLICATION NO.    : 16/229920
DATED              : July 7, 2020
INVENTOR(S)        : Hsu et al.

Page 1 of 1

It is certified that error appears in the above-identified patent and that said Letters Patent is hereby corrected as shown below:

On the Title Page

Twelfth inventor, item (72) delete "Kyle Coleman Skibble" and replace with "Kyle Skibbe"

Signed and Sealed this
Eighth Day of September, 2020

Andrei Iancu
*Director of the United States Patent and Trademark Office*